Dec. 27, 1949     T. R. SMITH     2,492,402

SEAL FOR OSCILLATING OR ROTATING SHAFTS

Filed April 27, 1946

INVENTOR.
Thomas R. Smith
BY Parkinson & Lane
Attys.

Patented Dec. 27, 1949

2,492,402

UNITED STATES PATENT OFFICE 2,492,402

SEAL FOR OSCILLATING OR ROTATING SHAFTS

Thomas R. Smith, Newton, Iowa, assignor to The Maytag Company, Newton, Iowa, a corporation of Delaware Application April 27, 1946, Serial No. 665,496

4 Claims. (Cl. 286—11.12)

The present invention relates to a novel sealing device adapted to be mounted on a rotating or oscillating shaft and for sealing against leakage along the shaft.

Among the objects of the present invention is the provision of a novel collar seal for a rotating or oscillating shaft so constructed and arranged as to seal against leakage of fluid along the shaft bearing in a housing or gear case.

The novel invention comprehends the provision of a resilient collar seal that is stretched or expanded onto an enlarged portion of the shaft and mounted in such manner as to tightly grip the shaft and prevent the seal from moving axially. Although it is preferably held upon the shaft by friction and the constriction of the resilient rubber-like material of which the seal is made, the seal may be clamped or firmly held in some other manner to maintain it anchored against movement axially of the shaft.

The invention further comprehends a novel seal adapted to be mounted upon a shaft in such manner as to obtain its initial sealing by means of axial compression, and which under increase in fluid pressure becomes self-sealing in operation.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment it is to be understood that the same is susceptible of modification and change and comprehends other details, arrangements of parts, features and constructions without departing from the spirit of the invention.

Figure 1:
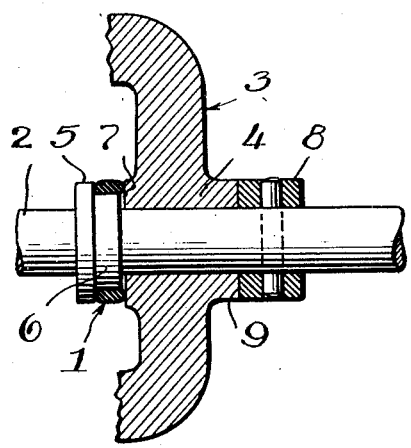
Figure 1 is a fragmentary view in vertical cross-section through the novel shaft sealing means.

Referring to the disclosure in the drawing, the illustrative embodiment shown in Fig. 1 comprises a cylindrical sealing ring or annular member 1 formed of a resilient or rubber-like material including natural or compounded synthetic rubber that may be stretched or expanded upon the shaft 2 shown as passing through a wall separating regions of different pressures in a housing or case 3. This sealing element seals the shaft against leakage of fluid along the shaft bearing or journal 4, and as shown in this view the seal is mounted at the pressure side or interior of the housing or case 3 so as to effectively seal against leakage at high pressures.

In this disclosed embodiment, the sealing element is held against axial movement at its back edge by contact against a face of an annular radially extending or stepped cylindrical shoulder 5 adjacent to and at the rear of an enlargement 6 provided on the shaft. The sealing element is mounted upon this enlargement with its forward edge seating against the inner face or radial seating surface 7 of bearing 4, whereby when the seal is assembled and held in position by means of a collar 8 pinned to the shaft and abutting against the shoulder or outer face 9 of the bearing, it is held under axial squeeze or deformation between the shoulder 5 and face 7 of the bearing.

Figure 2:
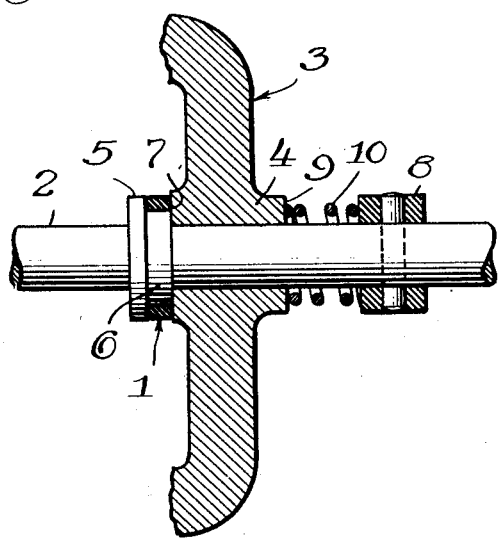
Fig. 2 is a view similar to Fig. 1 but showing an alternate embodiment of the invention.

In Fig. 2, is disclosed an alternate embodiment in which the collar 8 is pinned to the shaft but in spaced relation with the bearing. Between this collar and the outer face 9 of the bearing is provided a coil spring 10 seating and pressing against the collar and tending to move the shaft in such manner as to retain the annular sealing element 1 under axial compression between the annular shoulder 5 and the bearing face or seating surface 7. In both forms of the invention shown in Figs. 1 and 2, the inner shoulder or face on the enlarged portion 6 provides a positive stop against the inner face 7 of the bearing and thereby limits axial movement of the shaft in one direction and prevents any excessive squeeze or compression axially of the seal.

With extremely high pressures on the pressure side of the assembly, the shoulder or face on the enlargement 6 disposed adjacent the bearing will be forced over against the face 7 of this bearing or casing surrounding the shaft 2 and thereby prevent excessive squeeze on the seal. In the form shown in Fig. 2, the coil spring 10 may be sufficiently strong to retract and retain the inner shoulder or face of the enlargement against the adjacent face or seating surface 7 of the bearing without any pressure being exerted on the pressure side and, therefore, this form of construction is peculiarly adapted for sealing at low pressures or where the pressure on the pressure side is not sufficient or effective in forcing the sealing element tightly against the seating surface. When sealing at no or relatively low pressures, the axial deformation of the sealing element is relied upon to maintain the seal, but any fluid pressure or increase thereof on the pressure side forces the seal against the shaft or enlargement on which it is mounted and against the flat seating surface 7 whereby to strengthen or augment the sealing action.

Figure 3:
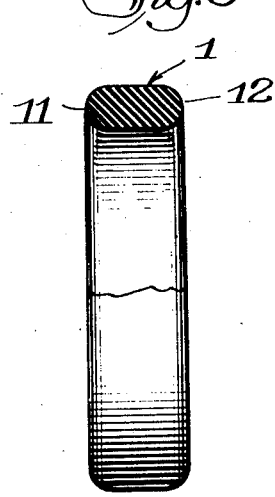
Fig. 3 is a view, part in vertical cross-section and part in end elevation, of the resilient sealing element.

As shown in the enlargement in Fig. 3, the cylindrical sealing element 1 has its opposite ends 11 and 12 rounded and when under deformation or squeeze, assumes substantially the contour shown in Figs. 1 and 2. The sealing member is retained on the shaft and obtains its initial sealing by means of axial deformation, but with an increase of pressure upon the pressure side the seal becomes self-sealing in operation as it is forced into the space or opening between the enlargement 6 on the shaft and the flat face 7 of the bearing or housing 3.

Figure 4:
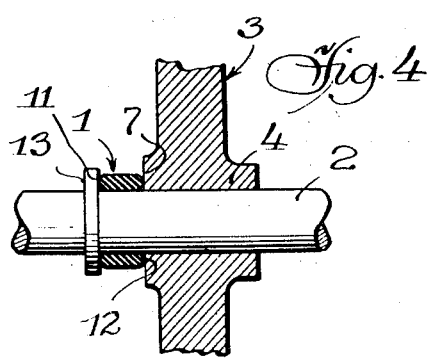
Fig. 4 is a fragmentary view showing the sealing ring stretched over a shaft and seating against the shaft bearing in the gear case or housing, but before any axial deformation has been applied thereto.

Although Figs. 1 and 2 show the seal mounted upon an enlargement upon the shaft, the invention comprehends mounting the sealing element 1 in the manner shown in Fig. 4 directly upon the shaft and between a face or radial shoulder on a collar or the like 13 and the flat seating surface 7 formed on the bearing 4 of the case or housing 3. As in the previous forms, the axial deformation of the sealing element 1 is controlled by suitable means such as a stop, collar or the like pinned or otherwise secured on and permitting the shaft but a limited amount of axial movement; it being understood that Fig. 4 is intended to show the relation and contour of the sleeve-like sealing element or collar seal after it has been mounted on the shaft but before it has been placed under axial deformation or squeeze. With the seal disposed on the normal diameter of the shaft, the rounded sealing surface at the back edge 11 seats against the shoulder on the collar 13 and the rounded sealing surface at the front edge 12 seats against the flat face 7 encompassing the shaft.

It is believed readily apparent that the invention comprehends a novel and simplified form of seal and assembly for sealing a shaft against leakage, the resilient sealing element being in the form of an annular ring or collar seal stretched or expanded over a portion of the shaft and held thereon by contraction and under axial deformation or squeeze between a shoulder on the shaft and a flat seating surface encompassing the shaft.

Having thus disclosed the invention, I claim:

1. In a sealing construction for a rotating or oscillating shaft extending through a wall separating regions of different pressures, said shaft having a pair of spaced radially extending stepped abutments constituting a radial shoulder and a radial stop thereon and providing therebetween an enlarged cylindrical surface, said wall being provided with a radially extending seating surface on the pressure side and disposed adjacent to and facing the abutments, a cylindrical resilient sealing element encompassing and contracted upon the cylindrical surface for rotation therewith and unconfined on its outer periphery and being provided with rounded end portions with one of its end portions initially projecting beyond the cylindrical surface and the stop in the direction of the seating surface and having its opposite end portion abutting the shoulder, and means acting on the shaft for moving the same in an axial direction to compress the sealing element axially and to cause the stop to engage the seating surface to thereby limit the axial deformation of the sealing element.

2. In a sealing construction for a rotating or oscillating shaft extending through a wall separating regions of different pressures, said wall having a radially extending seating surface on the pressure side, an enlargement provided on the shaft adjacent the seating surface and provided with an outer radially extending shoulder and an inner annular stop for limiting axial movement of the shaft in one direction, a cylindrical resilient sealing element unconfined on its outer periphery secured upon the enlargement with one edge seating against the shoulder and having its opposite edge rounded and initially projecting beyond the stop and adapted to seat against the seating surface of the housing, and means for moving the shaft axially so that the stop engages the seating surface to limit the axial deformation of the sealing element between the shoulder and seating surface and to maintain sealing contact thereat.

3. In a sealing construction for a rotating or oscillating shaft extending through a wall separating regions of different pressures, said wall having a radially extending seating surface surrounding the shaft on the pressure side, a stepped cylindrical enlargement on the shaft providing a shoulder to contact the seating surface and a radially extending abutment on the cylindrical enlargement spaced from the shoulder, and an annular resilient sealing ring mounted upon the enlargement and adapted to contact the abutment, said sealing ring being unconfined on its outer periphery and having an axial length greater than the axial length of the cylindrical enlargement whereby said shoulder limits the compression on the sealing element.

4. A sealing construction for a rotating or oscillating shaft extending through a wall of a casing separating regions of different pressures, said wall having a seating surface surrounding the shaft on the pressure side, an abutment provided on the shaft spaced from the seating surface on the pressure side, an annular axially deformable resilient sealing ring unconfined on its outer periphery mounted on the shaft to rotate therewith and having opposite edges in contact with said abutment and said seating surface, and means including a positive stop on said shaft for engaging a portion of said casing for limiting the axial deformation of the sealing ring to a predetermined amount.

THOMAS R. SMITH.

REFERENCES CITED

The following references are of record in the file of this patent:

UNITED STATES PATENTS

| Number | Name | Date |
|---|---|---|
| 425,756 | Conway | Apr. 15, 1890 |
| 429,611 | Facer | June 10, 1890 |
| 831,717 | Garlock | Sept. 25, 1906 |
| 949,115 | Davey | Feb. 15, 1910 |
| 1,313,201 | Mustor | Aug. 12, 1919 |
| 1,566,458 | Williams | Dec. 22, 1925 |

FOREIGN PATENTS

| Number | Country | Date |
|---|---|---|
| 455,615 | Great Britain | of 1936 |